June 5, 1928.  
C. HAMMER  
MACHINE FOR MAKING CAPS  
Filed March 9, 1927  
1,671,990  
2 Sheets-Sheet 2
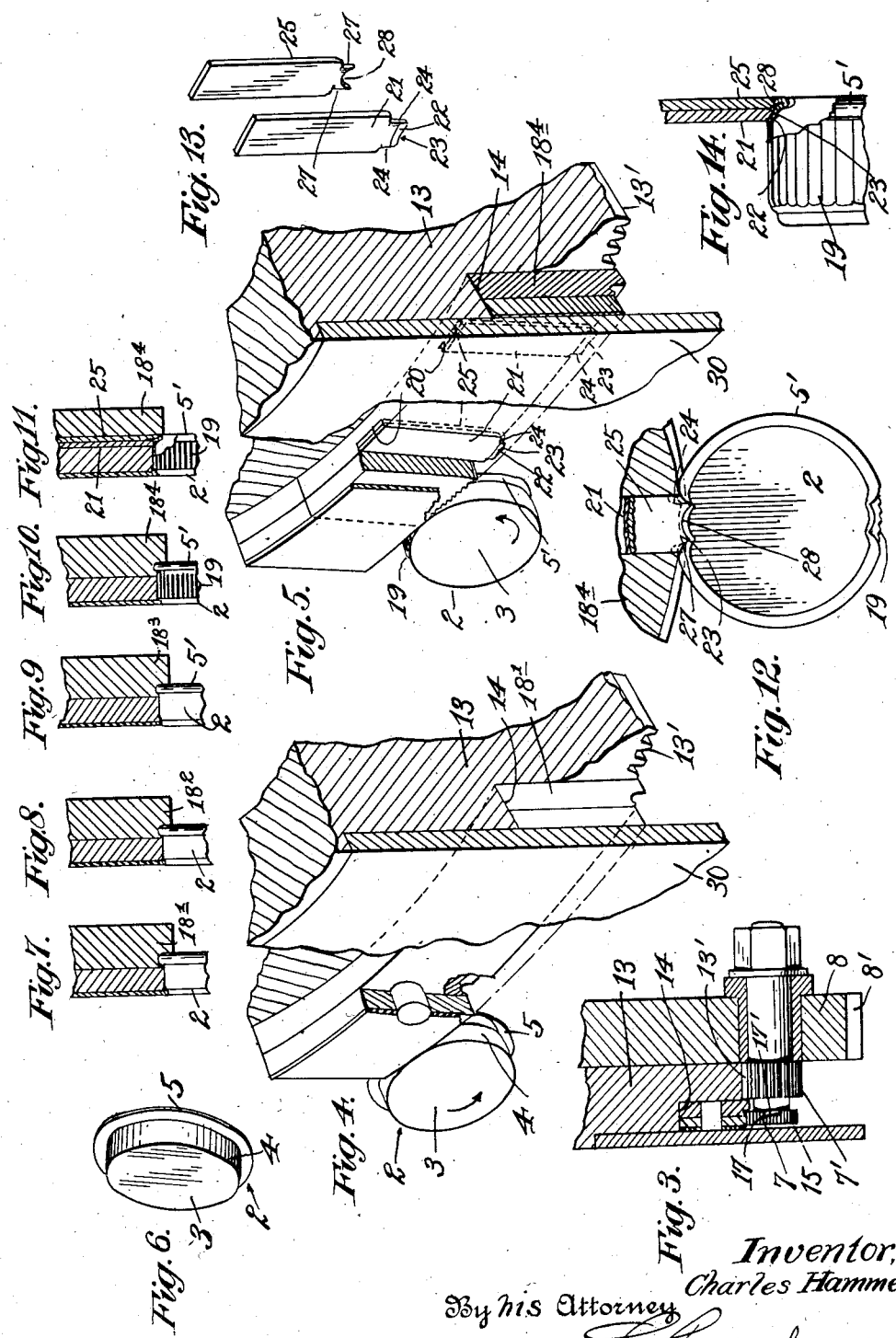
Inventor,  
Charles Hammer  
By his Attorney Patented June 5, 1928.

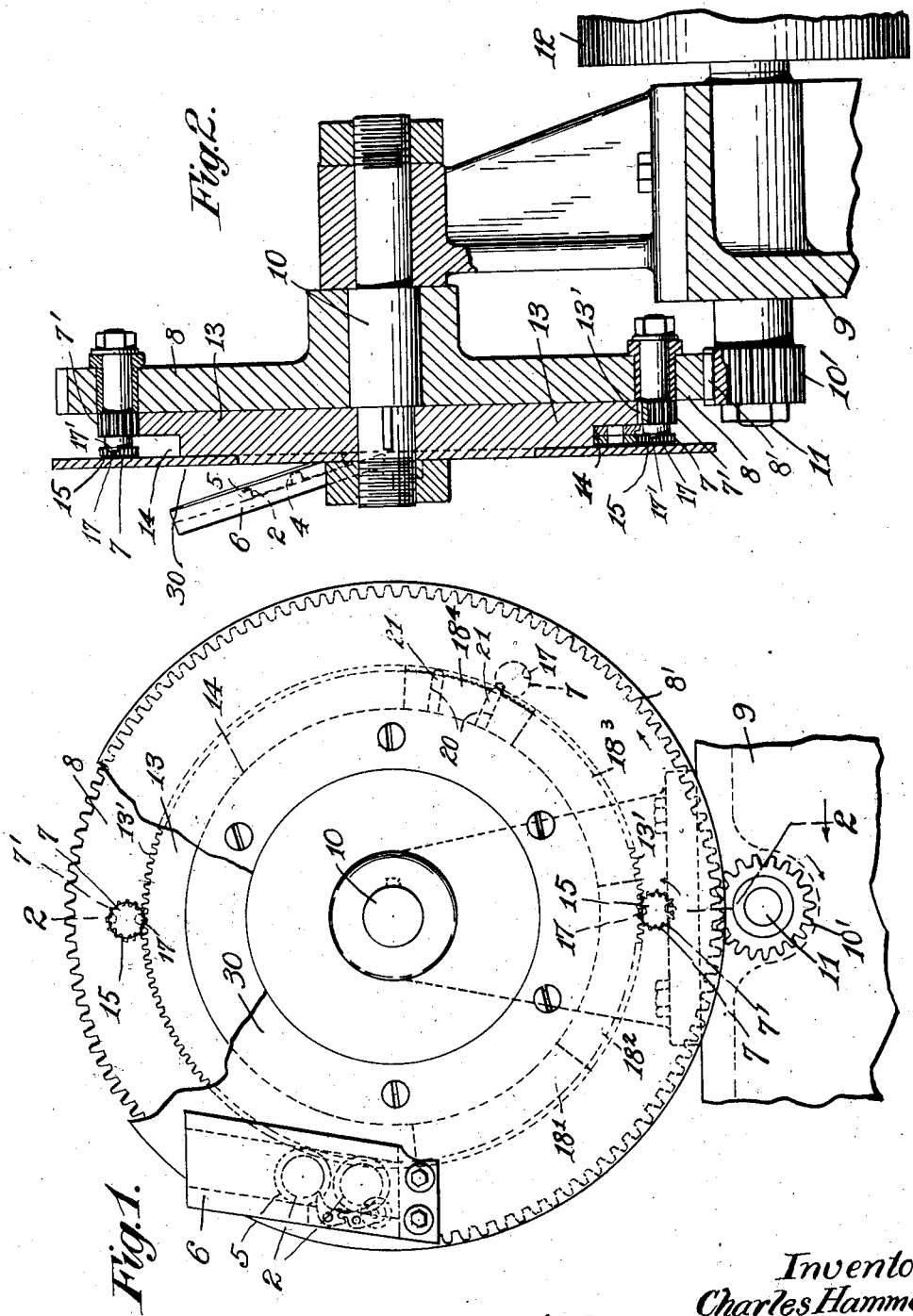

1,671,990

UNITED STATES PATENT OFFICE.

CHARLES HAMMER, OF HOLLIS COURT BOULEVARD, NEW YORK, ASSIGNOR TO AMERICAN METAL CAP COMPANY, OF BROOKLYN, NEW YORK, A CORPORATION OF NEW YORK.

MACHINE FOR MAKING CAPS.

Application filed March 9, 1927. Serial No. 174,059.

This invention relates to the manufacture of metal caps or closures commonly designated in the trade as lug caps for use on glass bottles or containers, an object of the invention being to provide an apparatus for forming caps with a plurality of lug formed projections having a concaved or arc shaped inner face substantially conforming to the curvature of the container whereby such lugs have greater holding effieciency and take up greater variations in the container threads or lugs and will engage and grip the glass threads of a container without the scratching or cutting thereof.

A further object of the invention is the provision of an apparatus for the manufacture of metal caps in which such caps will be provided with a beaded or curled lower edge which edge is utilized at intervals to form a plurality of arc shaped lugs, the arc of which is less than the arc of the major portion of the bead of the cap whereby the inner edge of such lugs will conform to the general curvature of the container thereby avoiding those objections heretofore present with lug caps in which the inner edges or faces of such lugs were straight.

A form of cap manufactured by this apparatus is illustrated and described in my co-pending application, Serial No. 149,022 filed November 18, 1926, wherein the advantages of this form of cap are pointed out.

In the drawings accompanying and forming part of this specification, Fig. 1 is an end view of a form of machine which may be used to make the improved cap, parts thereof being broken away and also in dotted lines more clearly to illustrate the structure; Fig. 2 is a cross sectional view taken on line 2—2, Fig. 1; Fig. 3 is an enlarged detail sectional view of one of the cap chucks and its associated parts; Fig. 4 is an enlarged perspective sectional view illustrating that part of the machine for initially starting the beaded or curled edge and shows the forming section illustrated in Fig. 7; Fig. 5 is a similar view illustrating that part of the machine for corrugating the skirt and forming the arc shaped projections in the curled edge and shows the forming section illustrated in Figs. 10 and 11; Fig. 6 illustrates the hat shaped blank in readiness to be treated to provide a curled or beaded edge having the arc shaped lugs; Figs. 7, 8, 9, 10 and 11 illustrate respectively the different steps for forming the bead and the lugs on the hat-shaped blank; Fig. 12 illustrates an inside view of the cap and the manner in which the lugs are formed on the bead thereof; Fig. 13 illustrates the arc shaped lug forming tools and Fig. 14 illustrates the cap with tools shown in Fig. 13 forming a lug.

Similar characters of reference indicate corresponding parts in the several views.

Before explaining in detail the present improvement and mode of operation thereof, I desire to have it understood that the invention is not limited to the details of construction and arrangement of parts which are illustrated in the accompanying drawings, since the invention is capable of other embodiments, and that the phraseology which I employ is for the purpose of description and not of limitation.

In the manufacture of the improved caps, a flat blank of sheet metal or tin is first stamped out into the hat-shaped form shown in Fig. 6 and these hat shaped blanks 2 comprising a top 3, a shirt 4 and an outwardly extending flange 5 are then rotated and also revolved and during this rolling procedure the flange 5 is subjected to inward radial pressure thereby gradually to curl or coil this flange into a bead which is also subjected to radial inward pressure to form the arc shaped lugs and during this rolling of the blank the skirt is also provided with corrugations. For carrying out this method the blanks 2 are supplied to a magazine 6 and automatically fed to chucks 7, two being herein shown, although any desired number may be used in practice. Each chuck 7 takes a blank from the magazine and conveys it into position to have the bead and the arc shaped lug formed thereon.

In the present instance these chucks are carried by a suitably supported rotary disk 8 having gear teeth 8' on its periphery and in this disk 8 the chucks are rotatably mounted. The disk 8 is supported by a suitable base or framework 9 carrying a shaft 10 on which the disk 8 is rotatable. The disk 8 is rotated by a pinion or gear 10' carried on a shaft 11 mounted in the framework 9 and to this shaft 11 motion is imparted by a suitable pulley 12, operated by a bolt not shown.

In practice suitable change gears are usually used between the pinion gear and the disk to regulate the speed of the disk 8. Keyed to the shaft 10 in front of this rotating disk 8 is a fixed disk 13 having an annular recess 14 in its front face and this disk is likewise provided with peripheral teeth 13' in position to mesh with gear teeth 7' carried by the chucks 7. Each of the chucks 7 is provided with a cap receiving portion or head 15 of corrugated form and recessed as at 17 according to the number of lugs the cap is to have, to permit the proper rolling of the lugs. The side wall 17' of each of these recesses is inclined or tapered thereby to give inclination or taper to the under or thread engaging face of each lug whereby it will substantially conform to the inclination or taper of the glass thread or lug.

On the rotation of the main or rotating disk 8 in which the chucks are rotatably mounted, the chucks will be revolved with the disk 8 and will also be rotated by the fixed disk 13 since the gear teeth 13' thereof are in mesh with the gear teeth 7' of the chucks, so that each chuck is revolved and also rotated on its own axis. Located in the annular recess of the fixed disk 13 and clamped therein are a series of forming sections $18^1$, $18^2$, $18^3$ and $18^4$ constructed to curl the edge of the cap and provide the same with the arc shaped lugs. Four of these sections are shown in the present instance. The forms of the first three sections are shown in Figs. 7, 8 and 9, in which the periphery of each section is so shaped as to engage the flange 5 of the hat shaped blank shown in Fig. 6 and as the cap blank passes over each forming section, the flange 5 is rolled or curled step by step into a bead 5' as shown in said Figs. 7, 8 and 9 thereby to form the beaded or curled edge of the cap. When the cap has been carried by its chuck 7 into the position shown for instance in Figs 5 and 10, the fourth forming section $18^4$ being provided with corrugations 19 corresponding to those on the chuck, the skirt 4 of the cap is corrugated as the cap is rolled around this section.

This fourth forming section $18^4$ is provided with a pair of recesses 20 in which is clamped the lug forming tools or blades 21 and 25, a pair of these recesses being shown in the present instance since the cap is provided with but two lugs.

It will of course be understood that the lug forming tools or blades could be made as one member instead of two, but so far it has been found to be less expensive to make them in two parts, and they are so shown herein.

One member 21 of the blade is provided with a beveled face 22 terminating in a slightly curved or arc formed end 23 with the sides of the tool notched or recessed as at 24 while the other member 25 has a somewhat similarly beveled end having notched sides 27 and an arc or concave end 28 corresponding to the arc that the lug is to receive. This beveled end may also be slightly tapered transversely of the tool corresponding somewhat to the inclination or taper of the chuck wall 17'.

In practice, as each chuck 7 is carried into position adjacent to the lower end of the magazine the chuck head takes therefrom a hat shaped blank 2 and carries it around the forming sections $18^1$, $18^2$, and $18^3$ carried by the fixed disk whereby these sections engage the flange 5 of the cap blank and gradually by radial inward pressure transform it into a curled or beaded edge. When the cap with this beaded edge has reached the fourth section $18^4$ of the forming sections, the corrugations in the skirt of the cap are formed and when the cap is brought into engagement with the first lug forming blade, the curled or beaded edge is by radial inward pressure forced into the recess 17 of the chuck and thus it is transformed into a tubular, arc shaped lug, the arc of which is less than that of the major portion of the bead and substantially conforms to the general contour of the container upon which the cap is to be used. As the lug is formed the under side thereof is forced against the inclined or tapered side wall 17' of the chuck and consequently this under or thread engaging wall is inclined or tapered to substantially correspond with the inclination of the glass thread or lug. As the cap blank is further revolved and rotated the opposite side is brought into position to be engaged by the other blade carried by the fourth section whereupon the diametrically opposed lug is similarly formed. It will be understood of course that if the cap is to have four lugs the fourth section will be provided with four similarly formed blades or punches.

Thus as the cap is rotated and revolved around the forming sections the edge of the cap is curled to the desired extent and the arc shaped lugs are formed therefrom. When completely formed they are removed from their chucks by any suitable means.

A suitable plate 30 is used for maintaining the caps in proper position on the chucks after the same are received from the magazine.

The corrugations in the skirt not only form a means for gripping the cap in the handling thereof but act as a reinforcing means to stiffen both the flange and the lug. They also provide an efficient means for the proper formation of the cap on the forming machine. The edge of the skirt is also strengthened by the bead or coil which as shown is outwardly and upwardly rolled to form a reinforced edge and this bead not only gives a pleasing appearance to the cap but it prevents cutting of the hands of the user and also provides a sanitary cap in that the raw edge is sealed and protected against corrosion and acids and the action of the elements. The bead is also particularly useful in strengthening the flange and the lug itself while providing means for forming the lugs therefrom at the lower edge of the skirt whereby they have increased strength and holding efficiency.

Thus it will be seen that at a plurality of places, shown as two in the form of cap shown, this reinforced bead or curled edge is radially pressed or inset inwardly toward the center of the cap to form inwardly extending lugs, which on the inside are curved or concaved lengthwise thereof, that is circumferentially between the ends of these lugs to substantially conform to the curvature of the glass container and to the general curvature of the bead, the curvature however being somewhat less than that of the bead but sufficient considering the short length of the lugs to conform to the general curvature of the glass container. This inwardly pressing and curvature of the lug is obtained by insetting or pressing the bead radially inward without materially deforming it while exerting a greater pressure at the opposite ends of the lug and at the same time somewhat flattening these ends of the lug with the result that the lug is tubular in cross section at its center which tubular formation also extends toward the ends so that the under side or the thread engaging face of the lug is of round or curved or beveled formation while the lug is also curved lengthwise thereof along its inner edge forming an arc somewhat less than that formed by the major part of the beaded edge.

When the chuck is formed with the inclined or tapered side wall 17' the under side of the lug in the direction of its length is inclined or tapered to conform to the tapered form of the chuck side wall 17' so that the tail end of the cap lug as it is turned onto a jar or bottle is somewhat closer to the top of the cap than the front end of the lug so that this under or thread engaging wall of the lug substantially conforms to the inclination of the glass thread and will engage under the glass thread throughout its entire length with its curved or concave inner face conforming to the curvature of the glass container. The curved formation of the lugs crosswise thereof also assists in preventing any cutting or scratching of the glass thread.

From the foregoing it will be observed that the lug is formed by pressure exerted upon the bead of the skirt sufficient to press this bead inwardly the desired extent without however materially deforming the lug between its ends while the ends of this crescent shaped lug are pressed inwardly to a greater extent. Thus the pressure on the lug is greater at spaced points than intermediate such points or ends of the crescent, and owing to the tapering depth of the die recess 17, it may also be said that the vertical or transverse pressure on the lug is greater at the deeper end of the recess 17 than at the other end. In other words, a part of the cap bead is inset from the rest of the bead but in such manner that the inner face of inset part is concaved instead of straight while the lug retains its tubular formation between its ends so that it is also of curved formation crosswise thereof. The radial inward pressure on the lugs also exerts a pressure transversely thereof particularly at the ends of the lugs to deform the ends of the lug and this pressure is sufficient to cause the under wall of the lug to conform to the inclined or tapered side wall 17' of the chuck so that an improved form of locking lug is obtained, tubular in cross section and curved in the direction of its length and also curved in cross section with a tapering thread engaging face in the direction of its length.

By having the lug of tubular formation the lug is not only strengthened, this being materially assisted by the corrugations above the lug which may run from adjacent to the top of the lug toward the top of the cap but the cap can be made of relatively thin sheet metal or of any other suitable material and yet have sufficient strength and resistance to resist any strain that may be placed upon the cap in the handling thereof.

From the forgoing it will be observed that this improved lug engages the glass threads practically throughout the entire length of the tapered face of the lug while conforming to the general curvature of the glass container under the thread and that it has no sharp straight cutting edge for engagement with the glass container so that there is no liability of the thread being cut or marked and that further owing to the tubular formattion of the lug it has a certain resilient or spring action so that when turned on to the thread of the container it will compensate for any inequalities or variations at the underside of the thread, in other words, it can be applied with a cushioning effect.

The cap turns on very easily and with a gradual gripping effect without any cutting or marking of the glass container or thread and altho it can be turned off easily yet it grips the thread effectively so that the cap will not jar off in the ordinary handling of the container while the cap is firmly drawn down to insure a tight seal between the liner and the mouth or upper edge of the container.

It is to be understood that by describing in detail herein any particular form, structure or arrangement, it is not intended to limit the invention beyond the terms of the several claims or the requirements of the prior art.

Having thus explained the nature of my said invention and described a way of constructing and using the same, although without attempting to set forth all of the forms in which it may be made, or all of the modes of its use, I claim:

1. In a machine for manufacturing lug formed caps, the combination of a rotary disk, means for rotating it, a cap carrying chuck carried by said disk, a fixed disk having teeth on its periphery, a gear carried by said chuck and in mesh with said disk teeth whereby the chuck is rotated during its revolution around the fixed disk, means for supplying a flanged hat-shaped cap blank to the chuck, means carried by the fixed disk for rolling said flange into a bead or coil, and means also carried by said fixed disk for forming an arc-shaped lug in said bead with a concaved inner face.

2. In a machine for manufacturing lug formed caps, the combination of a rotary disk, means for rotating it, a cap carrying chuck carried by said disk, a fixed disk having teeth on its periphery, a gear carried by said chuck and in mesh with said disk teeth whereby the chuck is rotated during its revolution around the fixed disk, means for supplying a flanged hat-shaped cap blank to the chuck, means carried by the fixed disk for rolling said flange into a bead or coil, and means also carried by said fixed disk for forming an arc-shaped lug in said bead with a concaved inner face at diametrically opposed points of the bead.

3. In a machine for manufacturing lug formed caps, the combination of a rotary disk, means for rotating it, a cap carrying chuck carried by said disk, a fixed disk having teeth on its periphery, a gear carried by said chuck and in mesh with said disk teeth whereby the chuck is rotated during its revolution around the fixed disk, means for supplying a flanged hat-shaped cap blank to the chuck, means carried by the fixed disk for rolling said flange into a bead or coil, and means also carried by said fixed disk for forming an arc-shaped lug in said bead with a concaved inner face, said means comprising a die having an arc-shaped end.

4. In a machine for manufacturing lug formed caps, the combination of means for supporting a cap blank for revolvable and rotary movements, means for engaging said blank during said movements to form a curl or bead thereon, and means for engaging said bead during said movements to form an arc-shaped lug in said bead, with a concaved inner face.

5. In a machine for manufacturing lug formed caps, the combination of means for supporting a cap blank for revolvable and rotary movements, means for engaging said blank during said movements to form a coil or bead thereon, and means for simultaneously corrugating said blank and engaging the bead to form a lug.

6. In a machine for manufacturing lug formed caps, the combination of means for supporting a flanged hat-shaped blank, means for rotating the blank, means for revolving the blank simultaneously with the rotation thereof, means for subjecting the flange of the blank to radial inward pressure during the rotation and revolution of the blank thereby to form a coil or bead, and means for subjecting the coil or bead at spaced intervals to radial inward pressure greater at the spaced points than intermediate such points, thereby to form an arc-shaped lug with a concaved inner face.

7. In a machine for manufacturing lug formed caps, the combination of means for supporting a flanged hat-shaped blank, means for rotating the blank, means for revolving the blank simultaneously with the rotation thereof, means for subjecting the flange of the blank to radial inward pressure during the rotation and revolution of the blank thereby to form a coil or bead, and means for subjecting the coil or bead at diametrically spaced intervals to radial inward pressure greater at the spaced points than intermediate such points, thereby to form an arc-shaped lug with a concaved inner face.

8. A machine for manufacturing lug forming caps comprising means for supporting a flanged hat-shaped blank, means for rotating said blank, means for simultaneously revolving the blank, means for rolling the flange of the blank into a bead or coil, and means for rolling into the coil or bead an arc-shaped lug with a concaved inner face.

9. A machine for manufacturing lug formed caps comprising means for supporting a flanged hat-shaped blank, means for rotating said blank, means for simultaneously revolving the blank, means for rolling the flange of the blank into a bead or coil, means for rolling corrugations into the blank, and means for rolling into the coil or bead an arc-shaped lug with a concaved inner face.

10. A machine for manufacturing lug formed caps comprising means for supporting a flanged hat-shaped blank, means for rotating said blank, means for simultaneously revolving the blank, means for rolling the flange of the blank into a bead or coil, means for rolling into the coil or bead an arc-shaped lug with a concaved inner face, and means for automatically supplying blanks to the blank supporting means during the revolution thereof.

11. A machine for manufacturing lug formed caps comprising means for supporting a flanged hat-shaped blank, means for rotating said blank, means for simultaneously revolving the blank, means for rolling the flange of the blank into a bead or coil, and means for rolling into the coil or bead an arc-shaped lug with a concaved inner face, said rotating and revolving means comprising a tooth formed rotary disk and means for rotating it, a tooth formed fixed disk, and a blank carrying chuck carried by the rotary disk and having a gear in mesh with the teeth of the fixed disk.

12. A machine for manufacturing lug formed caps comprising means for supporting a flanged hat-shaped blank, means for rotating said blank, means for simultaneously revolving the blank, means for rolling the flange of the blank into a bead or coil, and means for rolling into the coil or bead an arc-shaped lug with a concaved inner face, said rotating and revolving means comprising a tooth formed rotary disk and means for rotating it, a tooth formed fixed disk, and a blank carrying chuck carried by the rotary disk and having a gear in mesh with the teeth of the fixed disk, and sectional forming means carried by the fixed disk for rolling the flange into a bead and forming the lug in said bead.

13. A machine for manufacturing lug formed caps comprising means for supporting a flanged hat-shaped blank, means for rotating said blank, means for simultaneously revolving the blank, means for rolling the flange of the blank into a bead or coil, and means for simultaneously forming corrugations in the blank and a lug in the bead, said rotating and revolving means comprising a tooth formed rotary disk and means for rotating it, a tooth formed fixed disk, and a blank carrying chuck carried by the rotary disk and having a gear in mesh with the teeth of the fixed disk.

14. A machine for manufacturing lug formed closure caps comprising a pair of disks, a cap chuck carried by one of said disks, means for rotating and revolving said chuck, means carried by one of said disks for forming a bead on said cap, and means carried by one of said disks for forming an arc-shaped lug in said bead with a concaved inner face.

15. A machine for manufacturing lug formed closure caps comprising a pair of disks, a cap chuck carried by one of said disks, means for rotating and revolving said chuck, means carried by one of said disks for forming a bead on said cap, and means carried by one of said disks for forming corrugations on said cap and during the formation thereof forming a holding lug with a concaved inner face.

16. A machine for manufacturing lug formed closure caps comprising a pair of disks, a cap chuck carried by one of said disks, said chuck having a tapered side wall, means for rotating and revolving said chuck, means carried by one of said disks for forming a bead on said cap, and means carried by one of said disks for forming a tubular arc shaped lug in said bead with a concaved inner face and a tapered under or thread engaging face.

17. A machine for manufacturing lug formed caps comprising means for supporting a flanged hat-shaped blank, means for rolling said blank, means for simultaneously revolving the blank, means for rolling the flange of the blank into a bead or coil, means for forming corrugations in the blank and a lug in the bead, said rotating and revolving means comprising a tooth formed rotary disk and means for rotating it, a tooth formed fixed disk and a blank carrying chuck carried by the rotary disk and having a gear in mesh with the teeth of the fixed disk, said chuck having a lug receiving recess provided with a tapered or inclined side wall.

18. A machine for manufacturing lug formed caps, comprising means for supporting a flanged hat-shaped blank, means for rotating said blank, means for simultaneously revolving the blank, means for rolling the flange of the blank into a bead or coil and means for rolling into the coil or bead an arc shaped lug with a concaved inner face and a tapered under or thread engaging face.

19. A machine for manufacturing lug formed caps, comprising means for supporting a flanged-hat-shaped blank, means for rotating said blank, means for simultaneously revolving the blank, means for rolling the flange of the blank into a bead or coil, means for rolling corrugations into the blank, and means for rolling into the coil or bead an arc shaped lug with a concaved inner face and a tapered under or thread engaging face.

20. A machine for manufacturing lug formed caps, comprising means for supporting a cap blank having an out-turned flange, cooperating means having a concaved shaped end for exerting pressure on said flange metal of said blank, and means for rotating and means for revolving said blank and cooperating means relatively to each other thereby to form at intervals arc-shaped lugs with a concaved inner face.

21. A machine for manufacturing lug formed caps, comprising means for supporting a cap blank having an out-turned flange, cooperating means having a concaved shaped end for exerting pressure on said flange metal of said blank, means for rotating and means for revolving said blank and cooperating means relatively to each other thereby to form at intervals arc-shaped lugs with a concaved inner face, and a tapering under face.

22. A machine for manufacturing lug formed caps, comprising means for supporting a flanged hat-shaped blank, cooperating means for exerting pressure on the flange of said blank thereby to curl or bead it, and means having a concaved shaped end for exerting pressure on the beaded flange of said blank thereby to form at intervals arc-shaped lugs with a concaved inner face.

23. A machine for manufacturing lug formed caps, comprising means for supporting a flanged hat-shaped blank, cooperating means for exerting pressure on the flange of said blank thereby to curl or bead it, cooperating means having a concaved shaped end for exerting pressure on the bead, and means for rolling said blank and its cooperating means relatively to each other thereby to form at intervals arc-shaped lugs with a concaved inner face.

24. In a machine for manufacturing lug formed caps, the combination of means for supporting a cap blank means for revolving said blank, means for rotating said blank during its revolvable movement, and means for engaging said blank during said movements to form lugs therein.

25. In a machine for manufacturing lug formed caps, the combination of means for supporting a cap blank for revolvable and rotary movements, means for engaging said blank during said movements to form a coil or bead thereon, and means for engaging said bead during said movements to form lugs in said bead.

26. In a machine for manufacturing lug formed caps, the combination of means for supporting a hat-shaped cap blank having a flange for revolvable and rotary movements, means for engaging said blank during said movements to form a coil or bead from the flange, and means for engaging the bead to form lugs.

27. In a machine for manufacturing lug formed caps, the combination of a rotary disk, means for rotating it, a cap carrying chuck carried by said disk, a fixed disk having teeth on its periphery, a gear carried by said chuck and in mesh with said disk teeth whereby the chuck is rotated during its revolution around the fixed disk, means for supplying a cap blank to the chuck, means carried by the fixed disk for rolling a part of the blank into a bead or coil, and means also carried by said fixed disk for forming a lug in said bead.

28. A machine for manufacturing lug formed closure caps comprising a pair of disks, a cap chuck carried by one of said disks, means for revolving said chuck around the other disk and means for rotating said chuck during its revolvable movement, means for forming a bead on said cap, and means for forming holding lugs from said bead.

Signed at 1822-3-4 Park Row Building, New York City, this 8th day of March, 1927.

CHARLES HAMMER.